(12) United States Patent
Van Thillo et al.

(10) Patent No.: US 6,479,004 B1
(45) Date of Patent: Nov. 12, 2002

(54) SILICA-ALUMINA CARRIERS PREPARATION, HYDROGENATION CATALYSTS PREPARATION THEREWITH AND THEIR USE FOR AROMATICS HYDROGENATION

(75) Inventors: Hugo Van Thillo, Grimbergen (BE); Philippe Bodart, Clermont-sous-Huy (BE); Christian Lamotte, Seneffe (BE); Jacques Grootjans, Leefdaal (BE)

(73) Assignee: Fina Research, S.A., Feluy (BE)

( * ) Notice: Subject to any disclaimer, the term of this patent is extended or adjusted under 35 U.S.C. 154(b) by 1219 days.

(21) Appl. No.: 08/394,099

(22) Filed: Jul. 24, 1995

(30) Foreign Application Priority Data

Feb. 24, 1994 (BE) ............................................. 94870037

(51) Int. Cl.[7] ............................................. C04B 35/624
(52) U.S. Cl. .................. 264/211.11; 264/621; 264/623; 501/12; 502/235
(58) Field of Search ................................ 264/621, 623, 264/211.11; 501/12; 502/235

(56) References Cited

U.S. PATENT DOCUMENTS

| RE26,883 E | | 5/1970 | Marechal et al. | |
|---|---|---|---|---|
| 4,464,481 A | * | 8/1984 | Hilfmen et al. | ............. 502/228 |
| 4,919,871 A | * | 4/1990 | Lin et al. | ..................... 264/623 |
| 5,045,519 A | * | 9/1991 | Meyer et al. | ................ 502/235 |
| 5,268,101 A | * | 12/1993 | Anderson et al. | ............. 501/12 |

FOREIGN PATENT DOCUMENTS

| FR | A-2639256 | 5/1990 |
|---|---|---|
| GB | A-1352921 | 5/1974 |

OTHER PUBLICATIONS

Yoldas, Journal of Materials Science 12, Jun. 1977 pp. 1203–1208.*

* cited by examiner

*Primary Examiner*—James Derrington
(74) *Attorney, Agent, or Firm*—William D. Jackson

(57) ABSTRACT

The present invention relates to a process for preparing silica-alumina carriers preferably under the form of extrudates. Further, the present invention also provides hydrogenation catalysts prepared thereof. These catalysts are used in an improved process for the reduction of the aromatic hydrocarbons content present in hydrocarbon streams.

3 Claims, No Drawings

SILICA-ALUMINA CARRIERS PREPARATION, HYDROGENATION CATALYSTS PREPARATION THEREWITH AND THEIR USE FOR AROMATICS HYDROGENATION

The present invention relates to a process for preparing silica-alumina carriers and to hydrogenation catalysts prepared therewith. The present invention also relates to a process for the reduction of the aromatic hydrocarbons content in hydrocarbon streams.

Most of the liquid hydrocarbon products obtained by refining crude oil (distillates, gasolines, . . . ) contain levels of aromatic hydrocarbons which can be harmful for further use. Indeed, aromatics are known to reduce the cetane index of diesel fuels. Also, aromatics evaporating from hydrocarbons are more toxic than aliphatics. Finally, aromatics generate more smoke and more soot particles during combustion. Consequently, more and more environmental regulations are set up to limit the aromatics content in solvents or in transportation fuels.

The reduction of aromatics content in hydrocarbon streams can be carried out by catalytic hydrogenation on metal catalysts. However, most of the refining streams contain certain levels of sulphur and nitrogen compounds which are known as poison of these catalysts.

Group VIII transition metals such as Co or Ni supported on a carrier are very active catalysts, but in the presence of sulphur they are converted into inactive sulphides.

The use of Group VI-Group VIII bimetallic sulphides such as those of Ni—W or Ni—Mo can be found advantageous since their activity is less sensitive to sulphur. However, very high hydrogen pressures are required to observe significant aromatics conversion.

Noble metals such as Pt or Pd and alloys of noble metals deposited on a carrier are also known as active aromatics hydrogenation catalysts. The Applicants have already developed such hydrogenating catalysts as described in U.S. Reissue 26,883. However, these catalysts are based on low-alumina silica-alumina carriers. Further the shaping of such carrier requires a pelletising step. Said pelletizing step is slow, expensive and difficult to handle due to abrasion of the equipment; further by this method it is not possible to obtain catalyst particles with a diameter lower than 3 mm.

The need to use hydrocarbon streams, e.g. petroleum distillates, with lower and lower aromatics content is still requiring further improvements of hydrogenation catalysts.

It is an object of the present invention to provide for a silica-alumina carrier as well as a process for its preparation.

It is another object of the present invention to provide for an hydrogenation catalyst based on the silica-alumina carrier of the invention as well as a process for its preparation.

It is a further object of the present invention to provide for a hydrogenation process of hydrocarbon streams in the presence of the hydrogenation catalyst of the present invention.

According to the present invention, the silica-alumina carrier can be obtained by a process comprising the following steps:
(a) mixing an aluminum compound with a silicon compound to obtain a solution, said aluminum compound being chosen among aluminum alcoholate and aluminum carboxylate, and said silicon compound being chosen among silicon alcoholate and siloxane compounds;
(b) hydrolyzing the solution from step (a) under acidic conditions at a temperature comprised between 50° C. and 150° C.;
(c) cooling the mixture coming from step (b) in order to obtain a gel;
(d) processing the gel from step (c) to obtain a paste by eliminating the excess of volatile compounds such as acid and water;
(e) extruding the paste coming from step (d) under the form of extrudates;
(f) calcining the extrudates from step (e) at a temperature comprised between 300° C. and 700° C. for at least a few hours to remove the organic materials and moisture.

According to another embodiment of the present invention, the hydrogenation catalyst can be obtained by depositing one or more metals of Group VIII on the silica-alumina carrier of the invention.

The Applicants have unexpectedly found that it is possible to obtain a significant reduction of the aromatic hydrocarbon content of hydrocarbon streams when using the hydrogenation catalyst of the invention in a hydrogenation process.

The Applicants have now found that starting with an aluminum compound such as an aluminum alcoholate or an aluminum carboxylate and dissolving said aluminum compound into a silicon compound such as a silicon alcoholate or a siloxane compound to obtain a homogeneous solution, leads to beneficial results when the so-prepared support is used in the process of the invention.

The aluminum carboxylate is preferably a $C_1$–$C_4$ carboxylate. As example of aluminum carboxylate, one can cite aluminum acetate, hydroxyaluminum diacetate and aluminum acetylacetonate.

As an example of a siloxane compound, one can cite polyalkoxy siloxane (preferably with 1 to 4 $C_1$–$C_4$ alkoxy radicals per Si atom) such as e.g. polyethoxy siloxane having 1–9 Si atoms per molecule.

It has been found particularly suitable to use Al and Si alcoholates wherein each alcoholate group has from 1 to 4 carbon atoms. Generally, it is preferred to use Al isopropylate and $Si(OEt)_4$ or $Si(OMe)_4$.

The solution obtained at step (a) preferably comprises from 8 to 40% by weight, preferably from 9 to 25% by weight and more preferably from 10 to 15% by weight of aluminum oxide versus total oxide (i.e. aluminum oxide+ silicon oxide).

The hydrolyzing step (b) is preferably performed under weak acidic conditions (pH comprised between 2.5 and 4), for instance by pouring the solution from step (a) into acetic acid aqueous solution of 0.05 to 0.5 mole/liter. The hydrolysis is performed under stirring at a temperature comprised between 50° C. to 150° C. and preferably between 70° C. and 90° C.

According to the present invention the processing step (d) for preparing the silica-alumina carrier preferably consists of a drying step which is usually performed at a temperature comprised between 20° C. and 100° C., preferably between 50° C. and 80° C.

According to the present invention, step (e) can be performed either in an extruder to form extrudates or according to conventional pelletizing process. Preferably, the paste obtained at step (d) is processed in an extruder to form extrudates. Organic extrusion aids such as glycerol or methyl cellulose can be added to the mixture. According to a preferred embodiment of the present invention, these extrudates have a size lower than 3 mm, more preferably lower than 2 mm; this represents a great advantage because such processing was not possible with the prior art methods for preparing a low-alumina silica-alumina carrier. Indeed, the small size of the extrudates enhances the transportation of the reactants through the catalyst particles, and increases the volumetric activity for a given reactor.

In accordance with a preferred embodiment of the present invention, before the calcination step (f), the extrudates obtained at step (e) hereabove are allowed to dry between room temperature and 150° C.

The calcination temperature of step (f) is comprised between 300 and 700° C., preferably between 500 and 600° C.

According to another embodiment of the present invention the paste obtained at step (d) may also be blended with kaolin in an amount up to 10 parts for 100 parts silica/alumina; kaolin is added as an additional extrusion aid.

As indicated hereabove and according to another embodiment of the present invention, the hydrogenation catalyst can be obtained by depositing on the silica-alumina carrier of the invention one or more metals of Group VIII, preferably from 0.1 to 1.5 wt % in total.

The impregnation is preferably performed with a solution of one or more salts or complexes of noble metals of Group VIII. A salt or complex of platinum is preferred. More preferably the impregnation is performed by using an acidic complex of Pt, with the pH of the initial Pt complex solution being sufficiently low (<3, if possible<2) to favour Pt deposition while obtaining a good Pt distribution, but not too acidic to avoid carrier dissolution (>0.5, if possible>1). More preferably the impregnation is carried out by using an acidic $H_2PtCl_6$ solution in sufficient amount to have a Pt deposit of about from 0.1 to 1.5 wt % Pt, preferably from 0.3 to 1 wt % Pt.

In case of impregnation with a palladium salt either alone or in conjunction with the Pt salt, the use of $PdCl_2$ is preferred under similar conditions. In that case the amount of Pd deposited is of about 0.1 to 1.5wt % Pd, preferably from 0.3 to 1% Pd. Conjunction of Pt and Pd can be preferred since their joint use leads to better resistance to sulfur poisoning; a weight ratio of Pt to Pd of from 0.1 to 10 is most preferred.

As indicated hereabove and according to another embodiment of the present invention, a reduction of the aromatic hydrocarbon content is obtained when using the hydrogenation catalyst of the invention in a hydrogenation process of hydrocarbon streams.

The hydrocarbon streams are usually liquid hydrocarbon products obtained by refining crude oil (e.g. distillates, gasolines, . . . ), said products containing certain levels of aromatics hydrocarbons. The hydrogenation process of the present invention is particularly suitable for petroleum refinery distillates having a boiling range comprised between 60° C. and 350° C.

The hydrocarbon streams usually contain as a matter of practice a minimum of 0.1 p.p.m. by weight of sulphur, and an aromatic content of about 1 to 99% by volume.

The catalysts of the invention are less sensitive to sulphur in the feed than Pt/alumina catalysts. While not wishing to be bound by a theory, it is believed that the sulphur level in the feed partly determines the activity level of the catalysts of the invention (as do other reaction conditions as the temperature, the pressure, the amount of hydrogen and the contact time). If necessary, the sulphur content may be lowered by hydrogenating the hydrocarbon stream according to processes well known in the refining of hydrocarbon streams, e.g. in the presence of a catalyst comprising by way of an example, cobalt and molybdenum oxides supported on alumina.

More particularly, the catalyst of the invention may thus be used in a continuous method for reducing the aromatic hydrocarbon content of a hydrocarbon stream having a sulphur content preferably not greater than 1000 p.p.m. by weight (more preferably lower than 500 p.p.m.) and boiling in the range of 60° C. to 350° C., and hydrogenating said hydrocarbon stream on the catalyst whose silica-alumina carrier contains at least 75% by weight of silica, preferably 85% by weight of silica.

Hydrogenation is desirably carried out under the following conditions:

| | |
|---|---|
| Temperature: | 100 to 400° C., preferably 250 to 350° C. |
| | Liquid Hourly Space Velocity |
| | (LHSV): 0.1 to 20 v/v.h. (vol.liquid hydrocarbon feed/vol.cat./hour), preferably 0.5 to 10 v/v.h. |
| Pressure: | $5.10^5$ Pa to $70.10^5$ Pa, preferably 20 to $55.10^5$ Pa. |

Hydrogen to hydrocarbon ratio: 100 to 3,000 liters hydrogen at normal temperature and pressure (N.T.P.) per liter of liquid feed, preferably 150 to 2,500 liters hydrogen (in English units about 500–17,000 s.c.f., preferably 850–14,000 s.c.f. per barrel of liquid feed).

It is of great advantage to use as high a temperature as possible in order to increase the reaction rate. Temperature should, however, be kept under a certain limit according to the thermodynamic equilibrium. Use of temperatures higher than this limit indeed favors the dehydrogenation reaction rather than the hydrogenation reaction, as well as secondary reactions such as hydrocracking.

The process of the invention may be carried out continuously for very long periods of time.

The following examples are given to illustrate the process of the invention but without limiting its scope.

EXAMPLE 1

Several Extruded Silica Alumina Carriers were Prepared According to the Following Procedure

| | |
|---|---|
| Reagents: | tetraethylorthosilicate (TEOSi): 780 ml |
| | aluminium triisopropoxide (AliPrO): 125 g |
| | aqueous solution of 0.1 M acetic acid (HAc): 2.4 L |

Reagents mixing:
    AliPrO was dissolved into TEOSi under vigorous stirring to obtain a clear homogenised solution
    the mixture so obtained was added to the HAc solution
    then heated under reflux for 4 hours at 85° C. (adding a mixture of water and isopropanol to keep a constant liquid level)

the mixture was allowed to cool down, still maintaining stirring.

The gel was dried at 80° C. in a kneader. When the solid content of the mixture was sufficient to obtain an extrudable paste, the gel was extruded. The extrudates were allowed to dry at 11° C. for one night, then were calcined at 500–600° C. for 24 hours under air. Addition of glycerol (5% w.r.t. total oxides) was done during kneading to ease extrusion. The carriers so obtained were then impregnated with Pt using an acidic solution of $H_2PtCl_6$ (pH=1.2). The above procedure was repeated five times to give catalysts 1A to 1E.

The properties of the carriers and of the corresponding catalysts are listed in Table I as well as those of a commercial reference catalyst R1.

It can be seen from the results that some differences are observed between the carriers. They are related to the possible contamination of the carrier with impurities leached from the walls of the vessels or from the die of the extruder (e.g. catalyst 1E). In addition, changes of the solid content of the extrusion paste and of the extrusion equipment may induce slight variations of the surface area. For instance, a paste with a slightly higher solid content (catalyst 1A) had a lower surface area since the applied pressure during extrusion was higher.

The reference commercial catalyst was prepared by the impregnation of a pelletized carrier with $H_2PtCl_6$. The carrier itself was prepared by pelletizing a silica-alumina powder obtained as follows:

A sodium silicate solution was poured in an acidic solution containing an Al-salt for gelification. The mixture was washed with a solution containing $NH_4^+$ to remove sodium then with deionized water to remove the excess anions. The mixture was then spray-dried and calcined to obtain the carrier powder. Further washing with diluted acid solution was done to reduce the sodium content. Such procedures are described e.g. in J.Colloid. Science 2, 399 (1947) or Ind.Eng.Chem. 44 (12) 2857 (1952).

EXAMPLE 2

The various catalysts prepared in Example 1 were tested in a short standard catalytic activity test for the conversion of aromatics in a kerosene spiked with 700 ppm S. A comparison was made with the commercial catalyst reference R1 cited in Example 1 (Table II).

TABLE I

| Catalyst | | 1A | 1B | 1C | 1D | 1E | R1 |
|---|---|---|---|---|---|---|---|
| Pt | wt % | 0.63 | 0.66 | 0.77 | 0.60 | 0.67 | 0.61 |
| $Al_2O_3$ % | wt % | 11 | 12 | 12 | 12 | 12 | 12 |
| $Na_2O$ | wt % | 0.010 | 0.0028 | <0.001 | 0.006 | 0.09 | 0.088 |
| $K_2O$ | wt % | 0.012 | 0.0037 | 0.0025 | 0.003 | 0.008 | 0.006 |
| $Fe_2O_3$ | wt % | 0.064 | 0.0421 | 0.0296 | 0.013 | 0.047 | 0.046 |
| Cl | wt % | 0.18 | 0.17 | 0.16 | 0.15 | 0.18 | 0.12 |
| $SO_4$ | wt % | 0.004 | 0.009 | 0.011 | <0.02 | 0.02 | 0.15 |
| S.A.(*) | $m^2/g$ | 307 | 320 | nd | 329 | 351 | nd |
| S.A.(**) | $m^2/g$ | 288 | 259 | 300 | 274 | 295 | 374 |
| Part. Diam | mm | 1.7 | 1.9 | 1.9 | 1.7 | 1.7 | 3.0 |
| Sorbed $H_2$ ($\mu mol/g$)(***) | | 45.0 | 49.1 | 45.9 | 45.0 | 45 | 24 |
| % dispersion (***) | | 70% | 72.7 | 58 | 72 | 65 | 39 |

(*)surface area before impregnation
(**)surface area after impregnation
(***)fraction of Pt on the surface determined by using the technique described in J. Catal., 9, 125–127 (1967) and assuming $2H_2$ sorbed/Pt.
nd = not determined

TABLE II

Microtest evaluation on ground catalyst

| Catalyst | 1A | 1B | 1C | 1D | 1E | R1 |
|---|---|---|---|---|---|---|
| Aromatics Conversion % | 76 | 72.3 | 68.2 | 63.0 | 73.0 | 43 |
| $K_1$ constant cat. vol. | 8.6 | 7.5 | 6.7 | 6.0 | 7.7 | 3.4 |
| $K_2$ constant Pt. wt. | 11.8 | 14.1 | 12.8 | 13 | 15 | 8.2 |

$K_1$: kinetic constant, assuming order 1, and normalized to a constant space velocity.
$K_2$: kinetic constant, assuming order 1, and normalized to a constant Pt weight.

EXAMPLE 3

A catalyst carrier was been prepared using about the same procedure as in example 1. Hydrolysis was carried out using 0.17 M acetic acid solution to maintain the pH at 3. However, after hydrolysis, the gel was washed with water and dried at 110° C. A white wet powder was obtained, (3A), with about 50 wt % wetness. This powder was then used to prepare extrudates. To ease extrusion, it was mixed with a basic solution (containing a weak organic base) and with extrusion aid (methylcellulose). It was then calcined at 600° C.

The properties of the carrier (3B) are presented in Table 3. This carrier exhibits a high purity, and a high surface area (380 $m^2/g$).

The carrier was then impregnated with hexachloroplatinic acid according to example 1 and calcined at 420° C. The properties of the final catalyst (3C) are listed in Table III. Pt dispersion was been measured on the catalyst after reduction, following the procedure used in example 1. A good Pt dispersion was obtained, as well as a good catalytic activity.

TABLE III

Physico-chemical properties of extrudates prepared from dried gel and the catalyst obtained therewith

| Samples Ref. | Dry gel powder 3A | Extrudates 3B | Catalyst 3C |
|---|---|---|---|
| COMPOSITION (wt %) | | | |
| $Al_2O_3$ | | 13 | 13 |
| $Na_2O$ | | 0.024 | 0.030 |
| $K_2O$ | | 0.005 | 0.005 |
| $Fe_2O_3$ | | 0.034 | 0.033 |
| Cl | | | 0.15 |
| $SO_4$ | | 0.007 | 0.008 |
| Pt | | | 0.75 |
| SURFACE AREA ($m^2/g$) | 363 | 389 | 308 |
| PORE VOL. <1000A (ml/g) | 0.69 | 0.70 | 0.65 |
| AVER. PART. DIAM (mm) | | | 1.6 |
| $H_2$-CHEMISORPTION ($\mu$mol/g) | | | 47.0 |
| SURFACE $H_2$ (%)[a] | | | 61.1 |
| MICROTEST ACTIVITY | | | |
| Aromatic conversion[b] | | | 71 |
| $K_1$ cst cat. vol. | | | 7 |
| $K_2$ cst Pt wt. | | | 17 |

[a] cf example 1
[b] cf example 2

EXAMPLE 4

A catalyst was been prepared according the recipe of Example 1 but using kaolin as extrusion aid (5% kaolin vs oxides). Pt content after impregnation with $H_2PtCl_6$ was of 0.48% wt while Pt dispersion was found to be of 76%.

When evaluated in the microactivity test described in example 2, the resulting catalyst with only 0.48 wt % Pt showed a kerosene hydrogenation activity about 30% higher than the reference catalyst R1 of example 1.

It was been used to process a hydrocarbon feed boiling in the range 200–280° C. Table IV is presenting the feed properties while Table V is describing the operating conditions. Results obtained with said catalyst are showed in Table VI and compared to those obtained using the reference commercial catalyst R1 of example 1.

TABLE IV

FEED PROPERTIES

| Density | 0.827 |
|---|---|
| Aromatics FIA (vol %) | 30 |
| Aromatics High Pressure Liquid Chromatography | |
| moncaromatics (wt %) | 33.0 |
| diaromatics (wt %) | 2.2 |
| Sulphur (ppm) | 122 |
| Total Nitrogen (ppm) | 10 |
| Basic Nitrogen (ppm) | 8 |

TABLE V

OPERATING CONDITIONS

| Pressure ($10^5$ Pa (bar)) | 45 |
|---|---|
| $H_2$/Hydrocarbon (Nl/l) | 500 |
| Liquid Hourly Space Velocity (LHSV) (1/1 hr) | 1 |
| Temperature (° C.) | 260, 280, 300 |
| 2 days between each conditions | |

TABLE VI

RESULTS OF CONVERSION

| Conversion at | New Catalyst Ex. 4 | R1 Catalyst |
|---|---|---|
| 260° C. | 90 | 35 |
| 280° C. | 100 | 58 |
| 300° C. | 100 | 72 |

EXAMPLE 5

An extruded catalyst (5A) was prepared following the procedure described in example 4, except that 0.7 wt % Pt was deposited on the carrier.

The catalyst properties are shown in table VII. 100 ml of extruded catalyst 5A were then loaded in a tubular isothermal reactor and used to hydrogenate aromatics from a herosene cut. The feedstock properties and the reaction conditions are shown in tables VIII and IX respectively. A comparative trial has been carried out using 100 ml of the reference catalyst R1 (3 mm pellets). The results of both tests are presented in table X (catalyst 5A) and XI (catalyst R1). They show that the new catalyst formulation (5A) prepared using the new silica-alumina carrier and the impregnation procedure has an improved activity compared to catalyst R1. This improved activity will result in longer cycle length.

TABLE VII

Properties of catalyst 5A

| Catalyst | 5A | Ref. R1 |
|---|---|---|
| Pt (wt %) | 0.72 | 0.61 |
| $Al_2O_3$ (wt %) | 13 | 12 |
| $Na_2O$ (wt %) | 0.007 | 0.088 |
| $K_2O$ (wt %) | 0.013 | 0.006 |
| $Fe_2O_3$ (wt %) | 0.15 | 0.046 |
| Cl (wt %) | 0.21 | 0.12 |
| $SO_4$ (wt %) | 0.007 | 0.15 |
| Surface area ($m^2/g$) (final catalyst) | 304 | 374 |
| Particle diameter (mm) | 1.7 (extrudates) | 3 (pellets) |
| Sorbed $H_2$ (micromol/g) | 53 | 24 |
| % dispersion | 72 | 39 |

TABLE VIII

Feed properties

| Sp. gravity (15/4° C.) | 0.838 |
|---|---|
| Sulfur (ppm) | 38 |

TABLE VIII-continued

Feed properties

Nitrogen (ppm)

| | |
|---|---|
| basic | 3 |
| total | <10 |
| Flash point (° C.) | 106 |
| Viscosity @40° C. (cst) | 2.99 |
| Freezing point (° C.) | −17 |
| Smoke point (mm) | 18 |

ASTM D1319 FIA (vol %)

| | |
|---|---|
| aromatics | 24 |
| olefins | — |
| saturates | 76 |

HPLC aromatics (wt %)

| | |
|---|---|
| mono | 27 |
| di | 4 |
| tri | — |
| Cetane index | 51.45 |

ASTMD86 Distillation (° C.)

| | |
|---|---|
| IBP | 229 |
| 5% vol | 248 |
| 10% | 253 |
| 30% | 262 |
| 50% | 268 |
| 70% | 275 |
| 90% | 286 |
| 95% | 292 |
| FBP | 299 |
| Simdist 180− | 1.5 |

TABLE IX

Operating Conditions

| | | |
|---|---|---|
| Catalyst: | Test: | catalyst 5A (1.7 mm extrudates) |
| | Comparative trial: | catalyst R1 (3 mm pellets) |
| Feedstock: | kerosene (table VIII) | |
| LHSV: | 1.0 to 2.5 v/v.h | |
| Temp-: | 250–300° C. | |
| Total pressure: | 45 barg | |
| Quench with product: | liquid product/feed quench: 0.3 l/l | |
| Gas/oil ratio: | 500 Nl/l | |
| Make up gas: | 100% H$_2$ | |

(LHSV = liquid hourly space velocity = volume liquid feed/volume catalyst/hr)

TABLE X

Dearomatisation of kerosene on catalyst 5A - Product properties

| Catage (days) | 3 | 4 | 7 | 8 | 14 | 21 |
|---|---|---|---|---|---|---|
| Temperature (° C.) | 275 | 275 | 275 | 275 | 248 | 275 |
| LHSV (h-1) | 2.1 | 2.1 | 2.6 | 2.6 | 2.1 | 2.1 |
| C5-180+° C. | | | | | | |
| Sp. gravity (15/4° C.) | 0.759 | 0.759 | 0.762 | 0.777 | 0.786 | 0.789 |
| Sulfur (ppm) | | 41 | | 5 | 38 | 33 |
| Basic N (ppm) | | 5 | | 3 | <1 | |
| Total N (ppm) | <10 | | | <10 | | <10 |
| 180+° C. | | | | | | |
| Sp. gravity (15/4° C.) | 0.823 | 0.823 | 0.825 | 0.825 | 0.830 | 0.828 |
| Sulfur (ppm) | 3 | 10 | <2 | 4 | 4 | 6 |
| Basic N (ppm) | | 11 | | 9 | <1 | |

TABLE X-continued

Dearomatisation of kerosene on catalyst 5A - Product properties

| Catage (days) | 3 | 4 | 7 | 8 | 14 | 21 |
|---|---|---|---|---|---|---|
| Total N (ppm) | | 12 | | <10 | <10 | <10 |
| Flash point (° C.) | | 104 | | 103 | 106 | 107 |
| Freezing point (° C.) | | −16 | | −16 | −15 | −16 |
| Viscosity @ 40° C. (Cst) | | 2.97 | | 2.97 | 3.13 | 3.09 |
| Smoke point (mm) | | 29 | | 29 | 25 | 30 |
| FIA olefins (vol %) | 0 | 0 | 0 | 0 | 0 | 0 |
| FIA aromatics (vol %) | 2 | 2 | 3 | 5 | 9 | 7 |
| FIA saturates (vol %) | 98 | 98 | 97 | 95 | 9.1 | |
| HPLC mono (wt %) | 2.0 | 1.9 | | 2.9 | 9.6 | 5.3 |
| HPLC di (wt %) | 0.0 | 0.1 | | 0.0 | 0.0 | 0.0 |
| HPLC total (wt %) | 2.0 | 2.0 | | 2.9 | 9.6 | 5.3 |
| Cetane index | | 56.8 | | 57.3 | 54.5 | 55.4 |
| Distillation ASTM D86 | | | | | | |
| IBP | | 238 | | 239 | 240 | 242 |
| 5% | | 249 | | 250 | 254 | 255 |
| 10% | | 252 | | 252 | 257 | 256 |
| 30% | | 260 | | 261 | 262 | 263 |
| 50% | | 268 | | 269 | 269 | 270 |
| 70% | | 276 | | 276 | 276 | 277 |
| 90% | | 288 | | 288 | 288 | 288 |
| 95% | | 293 | | 294 | 294 | 295 |
| FBP | | 300 | | 302 | 299 | 300 |

Aromatics content of feedstock: 24% (FIA)

TABLE XI

Comparative trial: dearomatization of kerosene on catalyst R1 - Product properties

| Catage (days) | 3 | 4 | 7 | 8 | 15 |
|---|---|---|---|---|---|
| Temperature (° C.) | 275 | 275 | 300 | 300 | 275 |
| LHSV (h-1) | 1.0 | 2.0 | 2.5 | 2.5 | 2.5 |
| C5-180+° C. | | | | | |
| Sp. gravity (15/4° C.) | 0.767 | 0.773 | 0.797 | 0.794 | 0.796 |
| Sulfur (ppm) | 11 | <2 | 50 | 9 | 6 |
| Basic N (ppm) | <1 | <1 | 1 | 1 | |
| Total N (ppm) | <10 | <10 | <10 | <10 | |
| 180+° C. | | | | | |
| Sp. gravity (15/4° C.) | 0.823 | 0.826 | 0.828 | 0.828 | 0.832 |
| Sulfur (ppm) | 3 | <2 | 1 | 2 | 1 |
| Basic N (ppm) | <1 | <1 | <1 | <1 | 10 |
| Total N (ppm) | <10 | <10 | <10 | <10 | 10 |
| Flash point (° C.) | 104 | 103 | 110 | 107 | 112 |
| Freezing point (° C.) | −14 | −14 | −16 | −16 | −17 |
| Viscosity @40° C. (cst) | 2.98 | 3.00 | 3.06 | 3.06 | 3.02 |
| Smoke point (mm) | 29 | 30 | 27 | 27 | 23 |
| FIA olefins (vol %) | 0 | 0 | 0 | 0 | 0 |
| FIA aromatics (vol %) | 3 | 6 | 9 | 8 | 12 |
| FIA saturates (vol %) | 97 | 94 | 91 | 92 | 88 |
| HPLC mono (wt %) | 2.3 | 6.8 | 5.9 | 6.0 | 12.4 |
| HPLC di (wt %) | 0.0 | 0.0 | 0.0 | 0.0 | 0.3 |
| HPLC total (wt %) | 2.3 | 6.8 | 5.9 | 6.0 | 12.7 |
| Cetane index | 56.6 | 55.9 | 55.5 | 55.0 | 54.3 |
| Distillation ASTM D86 | | | | | |
| IBP | 240 | 234 | 243 | 244 | 244 |
| 5% | 249 | 250 | 255 | 255 | 257 |

TABLE XI-continued

Comparative trial: dearomatization of kerosene on catalyst R1 - Product properties

| Catage (days) | 3 | 4 | 7 | 8 | 15 |
|---|---|---|---|---|---|
| 10% | 252 | 253 | 256 | 256 | 257 |
| 30% | 260 | 261 | 262 | 262 | 262 |
| 50% | 267 | 269 | 269 | 269 | 270 |
| 70% | 274 | 276 | 276 | 276 | 277 |
| 90% | 281 | 288 | 288 | 288 | 288 |
| 95% | 282 | 295 | 293 | 293 | 294 |
| FBP | 284 | 297 | 301 | 301 | 302 |

Aromatics content of feedstock: 24% (FIA)

What is claimed is:

1. A process for preparing a silica-alumina carrier, said process comprising:

(a) mixing an aluminum compound with a silicon compound to obtain a solution, said aluminum compound being chosen from the group consisting of aluminum alcoholate and aluminum carboxylate, and said silicon compound being chosen from the group consisting of silicon alcoholate and siloxane compounds, said solution comprising from 9 to 25% by weight of aluminum expressed as oxide versus total oxide;

(b) hydrolyzing the solution from step (a) under weak acid conditions wherein the pH is between 2.5 and 4 at a temperature of between 50° C. and 150° C.;

(c) cooling the mixture coming from step (b) to obtain a gel;

(d) processing the gel from step (c) by drying the gel at a temperature of between 20° C. and 100° C. to obtain a paste by eliminating the excess volatile compounds, including acid and water;

(e) extruding the paste coming from step (d) into extrudates having a size lower than about 3 mm;

(f) calcining the extrudates from step (e) at a temperature of between 300° C. and 700° C. for at lease two hours to remove the organic materials and moisture.

2. The process according to claim 1 wherein prior to the calcination step (f), the extrudates obtained at step (e) are allowed to dry between room temperature and 150° C.

3. The process according to claim 2 wherein the paste obtained at step (d) is blended with kaolin an amount up to 10 parts per 100 parts silica-alumina.

* * * * *

UNITED STATES PATENT AND TRADEMARK OFFICE
CERTIFICATE OF CORRECTION

PATENT NO. : 6,479,004 B1
DATED : November 12, 2002
INVENTOR(S) : Hugo Van Thillo et al.

It is certified that error appears in the above-identified patent and that said Letters Patent is hereby corrected as shown below:

Column 5,
Line 30, replace "11º C." with -- 110º C. --;

Column 9,
TABLE X, at the intersection of the row labeled "Basic N (ppm)" and the column labeled "21" insert -- <1 --; and at the intersection of the row labeled "FIA saturates" and the column labeled "14" replace "9.1" with -- 91 --.

Column 12,
Line 21, replace "kaolin an" with -- kaolin in an --.

Signed and Sealed this

Fourth Day of May, 2004

JON W. DUDAS
*Acting Director of the United States Patent and Trademark Office*